May 19, 1936.  S. G. KOTELEVTSEFF  2,041,611
ADJUSTABLE PROPELLER
Filed May 15, 1935  2 Sheets-Sheet 1
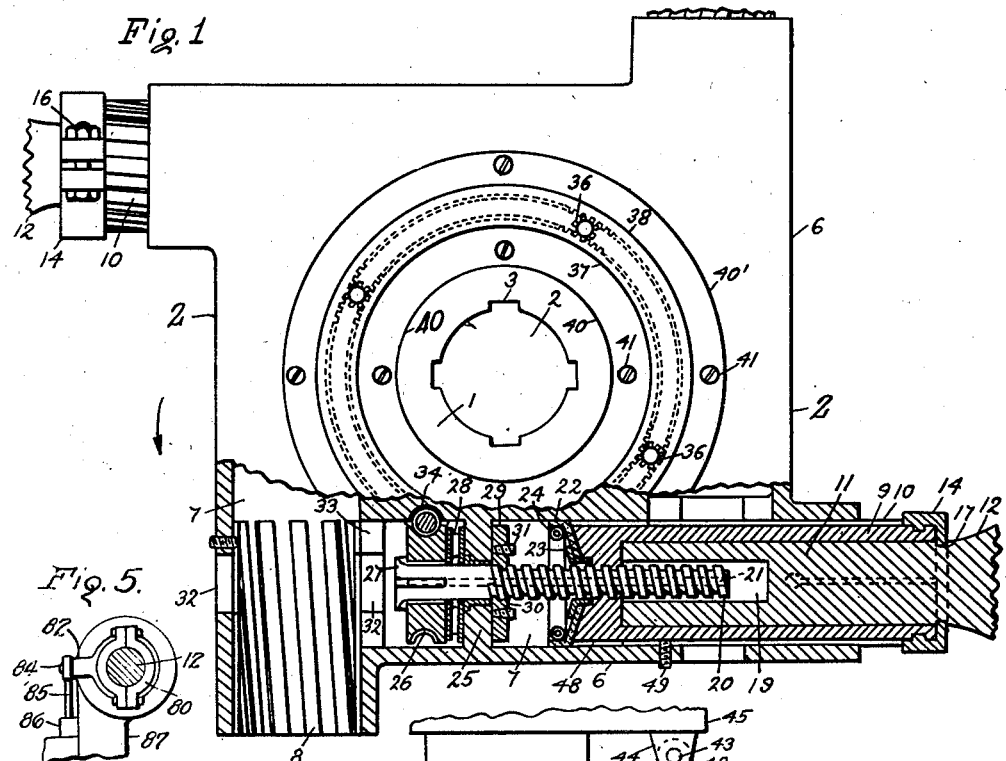
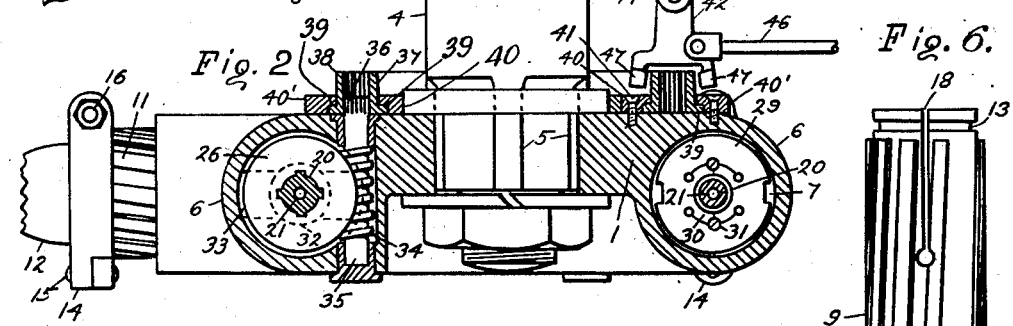
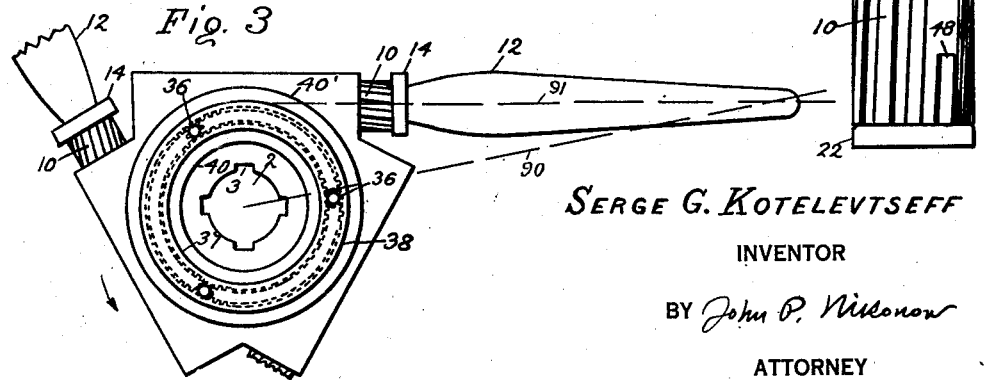
SERGE G. KOTELEVTSEFF
INVENTOR
BY John P. Nikonow
ATTORNEY May 19, 1936.   S. G. KOTELEVTSEFF   2,041,611
ADJUSTABLE PROPELLER
Filed May 15, 1935   2 Sheets-Sheet 2
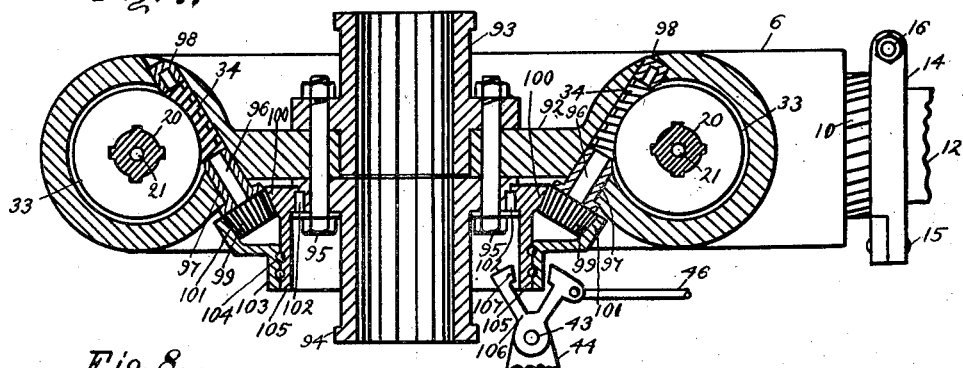
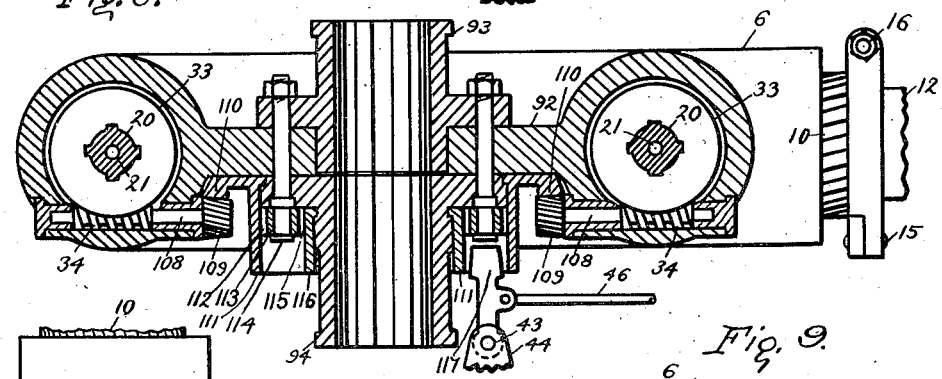
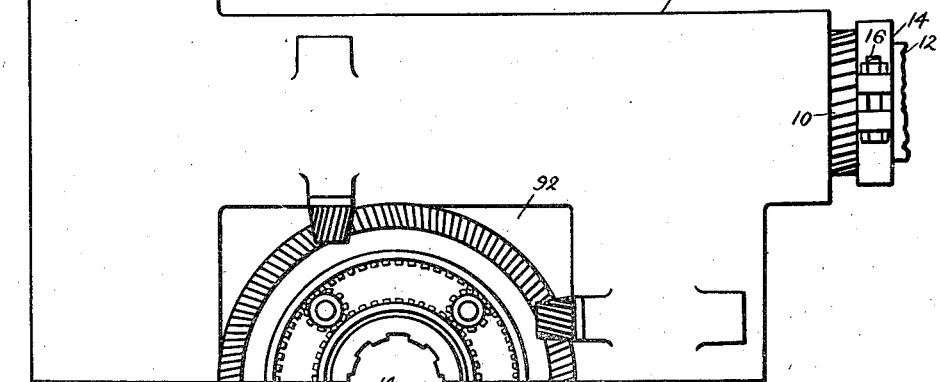
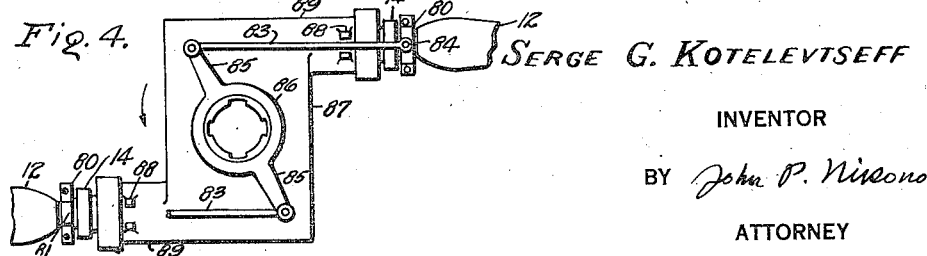
SERGE G. KOTELEVTSEFF
INVENTOR
BY John P. Nissonov
ATTORNEY Patented May 19, 1936

2,041,611

UNITED STATES PATENT OFFICE 2,041,611

ADJUSTABLE PROPELLER

Serge G. Kotelevtseff, New York, N. Y.

Application May 15, 1935, Serial No. 21,536

4 Claims. (Cl. 170—163)

My invention relates to adjustable propellers and has particular reference to propellers in which the blades can be turned and moved in their sockets in the hub.

The object of my invention is to provide a propeller for airplanes, airships and boats, the pitch of which can be adjusted during the flight as well as the diameter of the propeller.

Another object of my invention is to provide a propeller the blades of which are arranged tangentially on its hub so as to provide more room for the sockets on the hub in which the shanks of the blades are turned.

Another object of my invention is to provide a propeller with blades adjustable as to their pitch and diameter, the shanks of these blades being slidably fitted in tangentially arranged sockets on the hub, the sockets being provided with means for retaining a liquid lubricant which also acts as a shock absorbing medium.

My invention is more fully described in the accompanying specification and drawings in which—

Fig. 1 is a front view of my propeller partly in section, Fig. 2 is a side view of the same partly in section taken on the line 2—2 of Fig. 1, Fig. 3 is a front view of a three-bladed propeller, Fig. 4 is a view of another modification, Fig. 5 is a partial end view of a modification shown in Fig. 4, Fig. 6 is a detail view of a modification shown in Fig. 1, Fig. 7 is a sectional view of another modification, Fig. 8 is a sectional view of still another modification, and Fig. 9 is a partial rear view of a modification shown in Fig. 8.

My propeller consists of a hub 1 with a central aperture 2 with slots 3 for mounting on the end of a power shaft 4 of an engine 45 and provided with splines 5 fitting in the slots 3. On the periphery of the hub there are arranged tangential sockets 6 provided with cylindrical bores or apertures 7. The outer portions of these bores have spiral splines 8. Tubular members 9 are slidably fitted in the apertures 7 and have spiral splines 10 on the outside engaging the splines 8. The members 9 have cylindrical apertures inside into which shanks 11 of blades 12 are fitted. Splines are removed from the ends of the sleeves 9 and grooves 13 are provided for clamping collars 14. The clamps are made in two halves connected by hinges 15 and drawn together by bolts 16. Grooves 17 are made in the shanks 11 for the outer flanges of the clamps 14. The sleeves 9 have slots 18 so that these sleeves can be clamped tight over the shanks 11 by the clamping collars 14. The rear ends of the shanks have bores 19 for the ends of screws 20. The screws are threaded in the inner ends of the members 9 and are provided with longitudinal apertures 21. Leather collars 22 are fitted over the inner ends of the members 9 and are held by bushings 23 and expanding rings 24 so as to render the spaces 7 oil-proof.

The inner portion of the screw 20 is journaled in a partition 25 in the bore of the sockets 6. A worm gear 26 is mounted on the inner end of the screw and is retained by a shouldered portion 27 at the end and a thrust bearing 28 interposed between the gear and the partition. A nut 29 is screwed on the outer portion of the screw forming another thrust member for retaining the screw against any longitudinal movements. Slotted portions 30 are adapted to clamp the nut 29 in its position by means of expanding screws 31. The sockets abut with their inner portions into the outer portions of the adjacent sockets as shown. Holes 32 are provided in the walls of the sockets for inserting the screws 20 when the mechanism is being assembled. Slots 33 are also provided for insertion of the gears 26. Worms 34 on shafts 35 are in mesh with the gears 26. These shafts extend transversely in the hub and their ends are provided with pinions 36. Internal and external gear rings 37 and 38 are in mesh with the pinions 36. The rings have shoulders 39 retained by guiding rings 40 and 40' fastened to the face of the hub 1 by screws 41. The gear rings are mounted so that they are held by friction only and can be rotated in relation to the guiding rings.

A fork 42 is pivotally mounted on a pin 43 in a bracket 44 on a stationary portion of the engine 45 and is provided with an operating rod 46. The ends of the fork have friction blocks 47 adapted to engage one or the other of the gear rings.

The space 7 may be filled with a suitable lubricant.

One of the splines 10 is partly removed as shown in Figs. 1 and 8, the remaining short spline 48 forming a shoulder resting against a stop screw 49 when the member 9 is moved out thereby limiting the outward movement of the sleeves 9 with the blades. It is evident that any suitable number of sockets with blades can be arranged tangentially around the hub, and a three-bladed propeller is shown in Fig. 3.

In order to adjust the propeller during its rotation the rod 46 is pushed or pulled so that one or the other of the friction blocks 47 of the fork 42 bears against one of the rings 37 or 38. The gear ring engaged by the fork is accordingly prevented from rotation with the hub. The gear ring being stationary, the pinions 36 will be forced to rotate thereby rotating the gears 26 and screws 20. The rotation and the corresponding axial movement of the sleeves 9 with the blades 12 can be reversed by shifting the fork so as to engage its other friction block 47 with the other gear ring. Oil or air pass through the longitudinal aperture in the screw 20 when sleeve 9 is moved in or out.

A modified arrangement is shown in Figs. 4 and 5. Here the blades 12 are provided with collars 80 loosely fitted over recesses 81. The collars consist of two pieces each connected by bolts. They have lugs 82 to which rods 83 are pivotally connected by pins 84. The other ends of the rods are pivotally connected with the ends of lugs 85 extending from a collar 86 rotatively supported on a cylindrical extension of a hub 87. Lugs 88 on the sockets 89 guide the rods in their movements. With this arrangement the system of levers formed with the collar 86, lugs 85 and rods 83 ties the blades together in such manner that they can only move exactly the same distance even if there is some difference in the tension of the respective springs 66.

The tangential arrangement of the blades changes the centrifugal stresses, which tend to act at an angle in direction of a dashed line 91 instead of a line 90 as in ordinary propellers. The angular direction of the centrifugal force (Fig. 3) causes a certain amount of binding on the blade shanks holding them more firmly in the sockets.

Another modification is shown in Fig. 7. Here the steel sockets 6 are joined in the middle by a relatively thin plate 92 with a central aperture into which a splined bushing 93 is fitted and bolted together with a bushing 94 by bolts 95. The engine shaft is fitted into the bushings 93 and 94. Shafts 96 of the worms 34 are journaled in bushings 97 and 98 in the sockets at an angle to the engine shaft. The ends of the shafts 96 have bevel pinions 99 in mesh with bevel gears 100 and 101. The gear 100 is mounted on rollers 102 on the bushing 94, and the gear 101 is by its cylindrical extension 103 mounted on balls 104 on a cylindrical extension 105 of the gear 100. A fork 106 mounted on a shaft 43 and operated by a rod 46 may be brought into engagement with the cylindrical extensions 103 or 105 by its friction lugs 107. The operation of this propeller is similar to the operation of the propeller shown in Fig. 1.

Another modification is shown in Figs. 8 and 9. Here the worms 34 are mounted with their shafts 108 horizontally in the sockets 6 and are provided with bevel pinions 109 on the ends in mesh with a single bevel gear 110. The latter is rotatively supported on the bushing 94 and has a cylindrical extension 111 with an internal gear 112 in mesh with pinions 113. The latter are rotatively mounted on the extensions of bolts 114 joining together the bushings 93 and 94 and the hub plate 92. The pinions are also in mesh with external gears 115 on cylindrical members 116 rotatively mounted on the bushings 94. A friction arm 117 is supported between the extensions 111 and 116 on a pin 43 and can be moved against one of the extensions by the rod 46.

The operation of this propeller is similar to the other modifications described, except that the rotation to the shafts 108 from the gear 115 is transmitted through the idle satellite pinions 113.

Important advantages of my propeller are that it is adjustable both as to its pitch and diameter, its hub is made of a single piece of metal or block mounted directly on the end of the engine shaft; the sockets are arranged tangentially to the hub permitting a comparatively large movement of the blades; the movements are dampened to prevent fluttering of the blades; the mechanism is perfectly lubricated; the blades, being in contact with the hub through large metal surfaces, help to radiate engine heat.

I claim as my invention:

1. In an adjustable propeller, the combination of a hub provided with a central aperture for mounting on a power shaft, sockets formed tangentially on said hub, the outer portions of said sockets being spirally splined inside, propeller blades, the shanks of said blades being spirally splined and slidably fitted in the splined portions of the sockets, partitions in said sockets, shafts journaled in said partitions, the outer ends of said shafts being threaded and engaging the correspondingly threaded holes in the end portions of said shanks, worm gears mounted on the inner ends of said shafts, worms in mesh with said gears, means to prevent the axial movement of said threaded shafts, and means to selectively rotate said worms in either direction thereby turning said gears and said screws thereby changing the diameter and pitch of said propeller.

2. In an adjustable propeller, the combination of a hub, sockets formed tangentially on said hub and provided with cylindrical bores, propeller blades, the shanks of said blades being splined on the outside and slidably fitted in the corresponding splines in the outer portions of said bores, partitions in said sockets, shafts journaled in said partitions, the outer ends of said shafts being threaded and fitted in correspondingly threaded holes in the end portions of said shanks, means to prevent the axial movement of said shafts, and means to manually rotate said shafts in either direction thereby causing said shanks to move axially in said splined bores.

3. In an adjustable propeller, the combination of a hub in the shape of a steel plate, bushings bolted to said plate at the opposite sides and adapted to be fitted on a power shaft for said propeller, tubular sockets arranged tangentially on said hub, the outer portions of said sockets being splined inside, propeller blades, the shanks of said blades being splined outside and slidably fitted in said sockets, transverse partitions in said sockets, shafts journaled in said partitions, gears on the inner ends of said shafts, means to prevent axial movement of said shafts, the outer ends of said shafts being threaded and movably fitted in correspondingly threaded holes in the inner ends of said shanks, and means to manually turn said gears on said shafts thereby moving said shanks axially.

4. In an adjustable propeller, the combination of a hub, sockets formed tangentially on said hub and provided with cylindrical bores, propeller blades, the shanks of said blades being splined on the outside and slidably fitted in corresponding splines in the outer portions of said bores, partitions in said sockets, shafts journaled in said partitions, the outer ends of said shafts being threaded and movably fitted in corresponding threads in holes in the inner ends of said shanks, means to prevent the axial movement of said shafts in said partitions, means to manually turn said shafts in either direction for moving said shanks in said splines, and packing rings on the inner ends of said shanks adapted to seal the clearance between said shanks and the inner smooth portions of said bores, the space in said sockets between said shanks and said partitions being filled with a liquid lubricant.

SERGE G. KOTELEVTSEFF.